United States Patent [19]

Leukel et al.

[11] Patent Number: 4,770,916

[45] Date of Patent: Sep. 13, 1988

[54] ELECTRICALLY CONDUCTIVE FLOORING

[75] Inventors: Dieter Leukel, Düsseldorf; Horst Müller, Ratingen; Horst Tamm, Haan, all of Fed. Rep. of Germany

[73] Assignee: Henkel Kommanditgesellschaft auf Aktien, Düesselorf, Fed. Rep. of Germany

[21] Appl. No.: 944,264

[22] Filed: Dec. 19, 1986

[30] Foreign Application Priority Data

Dec. 21, 1985 [DE] Fed. Rep. of Germany ....... 3545760

[51] Int. Cl.[4] .............................................. B32B 33/00

[52] U.S. Cl. ........................................ 428/95; 428/40; 428/209; 428/286; 428/287; 428/408; 427/126.1; 427/402

[58] Field of Search .................. 428/95, 40, 209, 286, 428/287, 408; 427/126.1, 402

[56] References Cited

PUBLICATIONS

International Plastics Handbook, Macmillan Publishing Co., pp. 210–225, Fastac TM, photocopy of aerosol can.

Aldrich, Catalog Handbook of Fine Chemicals, 1986–1987, pp. 1105 and 1109, American Chemical Society, Chemcyclopedia, 1986, pp. 1 and 236.

*Primary Examiner*—Marion C. McCamish

*Attorney, Agent, or Firm*—Ernest G. Szoke; Henry E. Millson, Jr.; Mark A. Greenfield

[57] ABSTRACT

An electrically conductive flooring and method for constructing same upon an existing flooring, which comprises sequential layers of: a nonwoven base layer; an electrically conductive coating layer; an electrically conductive adhesive layer; and an antistatic or electrically conductive top layer; a copper band is optionally located within the coating layer and/or adhesive layer.

31 Claims, 1 Drawing Sheet

ELECTRICALLY CONDUCTIVE FLOORING

BACKGROUND OF THE INVENTION

1. Field of the Invention

This invention relates to an electrically conductive floor construction comprising a standard wearing surface which has a fabric or plastic or other synthetic or rubber covering as its uppermost layer and which combines good heat insulation with a pleasant, springy tread.

2. Statement of Related Art

In addition to the other qualities expected of a floor covering, the electrical conductivity of its wearing surface is becoming increasingly more important. Any person walking over a non-conductive floor covering develops an electrostatic charge, particularly in a dry atmosphere. This electrostatic charge can lead to unpleasant discharges when the person walking on the floor touches electrically conductive objects and, in addition, can interfere with computer operations or may even result in the ignition of explosive solvent-air mixtures.

For this reason, conductive wearing surfaces, in which a grounded copper band construction, more especially a copper net, is arranged beneath the uppermost layer, have already been used, particularly in the industrial sector. In the case of PVC tiles, it is necessary to lay the nets of intersecting copper bands in such a way that they cross in the middle of the tiles, so that a zone of particularly good electrical conductivity is situated beneath the middle of each tile. In order to simplify this extremely expensive construction, attempts have already been made to use conductive grouts or even conductive primers. In cases such as these, however, a solid subfloor which satisfies user or safety requirements for flooring has to be present (such as in German Industrial Norm-DIN 18,365).

In order, therefore, to create the proper conditions for laying a conductive floor, the old coverings have to be completely removed. Unfortunately, this involves considerable effort because adhesive residues adhere readily to the subfloor and, particularly if they are relatively old, can only be removed with considerable difficulty. Accordingly, it has often been necessary to remove parts of the subfloor mechanically, an operation which generates considerable noise and dust.

SUMMARY OF THE INVENTION

This invention affords an electrically conductive flooring which may be laid upon an existing flooring, as well as a method for constructing such flooring.

According to the invention, the new flooring, generally designated as (B), is applied to the old (i.e. existing) flooring, generally designated as (A). Flooring (B) is built up by applying its components in consecutive layers upon existing flooring (A). As a result, it is no longer necessary to remove the old flooring and its adhesive.

More specifically, the electrically conductive flooring according to this invention is obtained by applying the following sequence of covering layers to an existing standard or conductive floor wearing surface which comprises fabric, plastic, rubber tiles, or the like:

(a) a nonwoven base layer provided on the side facing the old flooring with a layer of contact adhesive;

(b) an electrically conductive coating layer on top of the nonwoven layer;

(c) an electrically conductive adhesive layer on top of the conductive coating layer; and (d) an antistatically finished or electrically conductive top layer constituting the exposed weaving surface.

Thus, the present invention affords both the above novel method for making a floor electrically conductive without removing the existing flooring, and the novel electrically conductive flooring itself.

BRIEF DESCRIPTION OF THE DRAWING

The FIGURE is a schematic view of a cross-section of the new flooring (B) according to this invention, laid on top of an existing flooring (A), with layers (a) to (d) as identified herein.

DETAILED DESCRIPTION OF THE INVENTION

Figure 1:
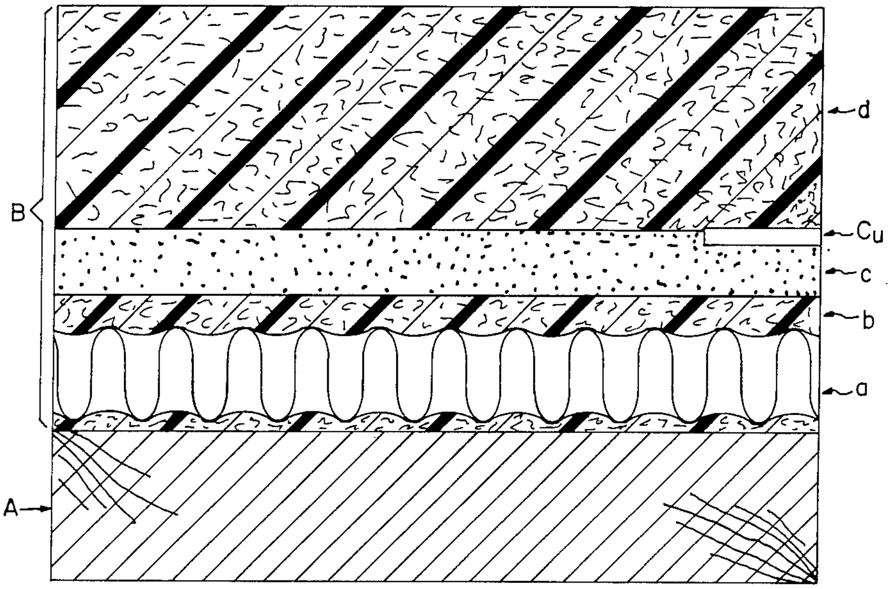

Other than in the operating examples, or where otherwise indicated, all numbers expressing quantities of ingredients or reaction conditions used herein are to be understood as modified in all instances by the term "about".

(a) The nonwoven layer is electrically nonconductive or substantially non-conductive and is provided on one side with a layer of contact adhesive and is preferably a random-fiber nonwoven of polypropylene, polyethylene, polyterephthalate, polyamide fibers, or any mixture thereof. The nonwoven as a whole should have a weight density of from about 40 g/m$^2$ to about 250 g/m$^2$ and preferably from 60 to 120 g/m$^2$. Any conventional contact adhesive is acceptable, although a particularly suitable contact adhesive coating is a dispersion whose films show high surface tackiness. This is applied to the existing flooring as a first layer as shown in the FIGURE.

(b) The nonwoven is then provided with a conductive coating layer applied in the form of a paint. This conductive coating (primer) contains at least one electroconductive substance, preferably carbon black or graphite. The coating binder is preferably at least one synthetic or natural latex, polychloroprene, polybutadiene-styrene, or polybutadiene-acrylonitrile latices or their mixtures having been successfully used. The latices preferably contain rosin derivatives or other hydrocarbons known as "tackifiers" or terpene or balsam resin in dispersed form. Conventional auxiliaries, such as zinc oxide, chalk or barium sulfate, may also be included. The above-mentioned electroconductive substances are also best used in the form of commercial dispersions; the usual wetting agents and emulsifiers should also be present in the system. The primer coating layer may be applied by brushing, roll coating or spray coating and should be dry in about 3 to 24 hours, preferably 5 to 12 hours, depending on the temperature and air circulation.

(c) The electrically conductive adhesive is then applied to the dried coating layer. Thin copper bands in a plane parallel to the flooring are optionally placed in the adhesive or in the coating layer, or both, for additional electrical grounding. This is intended to guarantee satisfactory elimination of any charge generated by people walking over the floor. It is sufficient to use one copper band for an area of from about 20 to 35 square meters. The band itself should be 1 to 2 meters long, 0.05 to 0.25 mm thick, and 5 to 15 mm wide. The entire floor construction is grounded by cementing in these thin copper bands, which should be in electrical contact with each other, and grounding the resulting network at one or more points.

The electrically conductive adhesives which are used in this invention should contain at least one substance which imparts conductivity , such as carbon black, graphite, copper powder, or silver powder, carbon black being preferred.

Aqueous dispersions of at least one vinylacetate and/or acrylate polymer or copolymer, more especially at least one copolymer of acrylates of medium chain length ($C_{3-8}$) and vinylacetate, have proved to be favorable binders for the actual adhesive. Copolymers consisting predominantly of vinylacetate and, to a lesser extent, of ethylene, propylene and/or acrylates, may also be used. Latices of natural (i.e. rubber) or synthetic elastomers, for example of polystyrenebutadiene, may also be used. Preferred binders are latices of $C_{3-8}$ acrylate copolymers, vinylacetate-acrylate copolymers, polystyrene-butadiene, or naturally occurring elastomers, or any mixture thereof. These basic dispersions should also contain the other auxiliaries typical of adhesive systems, such as preservatives, antioxidants, and fillers, for example chalk, quartz powder, barium sulfate, zinc oxide or titanium dioxide, all of which directly enhance the strength and load resistance of the bond. The carbon black or other electroconductive should be added to the adhesive in the form of a commercial dispersion and should be present in a quantity of 3 to 10% by weight, based on total solids weight.

The electroconductive adhesive should be applied in a quantity of 100 to 600 g/m$^2$, preferably 250 to 500 g/m$^2$, (wet) by any known means, such as a standard toothed spatula, or even a power spray.

(d) The top layer is placed upon the electroconductive adhesive while it is still tacky, and itself must be electrically conductive or at least antistatic. Known PVC and rubber coverings containing carbon black or graphite and used as electrically conductive elastomeric or flexible floor coverings are appropriate. Antistatic floor coverings such as carpeting, tiling, linoleum, and the like, made from PVC and from various fabrics are also useful. Antistatic PVC coverings contain moisture-retaining chemicals while antistatic fabric coverings may be produced using steel fibers and carbon fibers. Any of these, or combinations thereof, may be applied as the final (top) layer, resulting in a completed antistatic flooring.

EXAMPLE 1

The substrate (existing flooring) comprised a jute-backed velvet-pile carpet which was firmly bonded to the screed. The carpet first was carefully cleaned by means of a vacuum cleaner.

A 75 g/m$^2$ polypropylene nonwoven coated on one side with a layer of contact adhesive (150 g dry/m$^2$) was first applied. The contact adhesive consisted of an acrylate copolymer containing carboxyl groups ("Acronal" V 205, a trademark of BASF, Parsippany, N.J.). The dispersion had a solids content of 70%, a pH value of 4 and a viscosity of 1200 mPa.s at 23° C., as measured by a Contraves Rheometer.

The electrically conductive primer was then applied to the nonwoven by roller in a quantity of 200 g (wet) per square meter. The dispersion consisted of 42% by weight of a polychloroprene dispersion ("Neoprene" Latex 115, a trademark of DuPont, Wilmington, Del.), 30% by weight of a natural resin dispersion (rosin derivative dispersion No. 5786 from Hercules Chemical, Wilmington, Del.), and 28% by weight of a 25% carbon black dispersion ("Derussol" AN, a trademark of Degussa Inc., New York, N.Y.). It also contained the usual antioxidants, preservatives and protective colloids. The pH of the dispersion was 9. A dried primer had a resistance according to German Industrial Norm (DIN) 53,276 of less than $3 \cdot 10^5$ ohms.

A 1 meter long copper band measuring 1 m$\times$0.2 mm was placed in the still wet primer in the 30 m$^2$ test room for subsequent grounding.

After the primer had dried (12 hours), an electrically conductive adhesive was applied in a quantity of 300 g/m$^2$ (wet) using a toothed spatula (A3: tooth space depth 1.65 mm, tooth space width 1.5 mm, tooth bridge width 0.5 mm).

The adhesive had the following composition:

- 25% by weight aqueous 60% dispersion of a copolymer of acrylates with vinylacetate ("Acronal" V 303, a trademark of BASF, Parsippany, N.J.)
- 2% by weight triethylene glycol monobutylene
- 4% by weight xylene
- 10% by weight rosin (dispersed)
- 18% by weight chalk
- 9% by weight quartz powder
- 32% by weight carbon black dispersion, 25% by weight ("Derussol" AN1-25/11, a trademark of Degussa Inc., New York, N.Y.).

After drying, this adhesive had a resistance of less than $3 \cdot 10^5$ ohms. Electrically conductive 2 mm thick PVC tiles ("Mipolam" 480 CE trademark) measuring 60.8$\times$60.8 cm were then laid on the still moist adhesive bed. After one week, the DIN conductivity of this floor construction measured $1 \cdot 10^6$ ohms, which was considered as indicative of a satisfactory antistatic flooring.

EXAMPLE 2

The substrate was a flooring top (wearing) surface in the form of a needle felt which was carefully cleaned with a vacuum cleaner. The nonwoven of Example 1 coated on one side with contact adhesive was then applied. The polychloroprene primer of Example 1 containing carbon black was then applied by roller. After it had dried overnight, the conductive carpet adhesive was applied by spatula (B1: tooth space depth 2.1 mm, tooth space width 2.3 mm and tooth bridge width 2.7 mm) in a quantity of 400 g/m$^2$ (wet).

The conductive adhesive had the same composition as in Example 1.

After drying, and testing in the same manner as the flooring of Example 1, it was concluded that a satisfactory antistatic flooring had been produced.

In an alternative embodiment of this invention, the layered flooring may be prefabricated and laid as a single composite laminate or as composite laminate tiles, using the above-mentioned contact adhesive of the nonwoven base layer.

In other embodiments, a decorative parquetry or other veneer may be incorporated in the top layer.

We claim:

1. An electrically conductive flooring, laid upon an existing worn or non-conductive flooring, consisting essentially of, in sequential layers from bottom to top:

(a) an electrically non-conductive or substantially non-conductive nonwoven base layer, provided on the side facing said existing flooring with a layer of contact adhesive;

(b) an electrically conductive coating layer having a latex binder on top of said nonwoven base layer;

(c) an electrically conductive adhesive layer containing at least one conductivity-imparting substance on top of said coating layer; and (d) an antistatically finished or electrically conductive top layer constituting the exposed wearing surface, on top of said conductive adhesive layer.

2. The flooring of claim 1 wherein at least one copper band about 1–2 meters long, about 5–15 mm wide, and about 0.05–0.25 mm thick is located within said coating layer, said conductive adhesive layer, or both, said band extending in the plane of said layers, one such band being located within said flooring for every 20–35 $m^2$ of said flooring surface, and each said band being in electrical contact with an adjacent band, so as to form a conductive network capable of being grounded.

3. The flooring of claim 2 wherein said nonwoven base layer is an electrically non-conductive or substantially electrically non-conductive random-fiber nonwoven of polypropylene, polyethylene, polyterephthalate or polyamide fibers, or any mixture thereof, having a weight density of about 40–250 g/$m^2$; which base layer is provided with a layer of contact adhesive on that side which faces said existing flooring.

4. The flooring of claim 3 wherein said electrically conductive coating layer is polychloroprene whose electroconductive active substance consists essentially of carbon black and/or graphite.

5. The flooring of claim 4 wherein said electrically conductive adhesive layer consists essentially of latices of $C_{3-8}$ acrylate copolymers, vinylacetate-acrylate copolymers, polystyrene-butadiene, naturally occurring elastomers, or any mixture thereof as a binder, and carbon black as its electroconductive active substance.

6. A method for constructing the electrically conductive flooring of claim 5 comprising: sequentially (1) applying said base layer to said existing flooring by contacting said side thereof having a layer of contact adhesive with said existing flooring;

(2) applying said coating layer in liquid form to the exposed upper surface of said nonwoven layer;

(3) placing said copper bands in electrical contact with each other within said coating layer while it is still wet, and thereafter permitting same to dry or drying same;

(4) applying said adhesive layer in liquid or paste form to said coating layer after it has dried; and (5) applying said top layer to said adhesive layer while said adhesive layer is still tacky.

7. A method for constructing the electrically conductive flooring of claim 4 comprising: sequentially (1) applying said base layer to said existing flooring by contacting said side thereof having a layer of contact adhesive with said existing flooring;

(2) applying said coating layer in liquid form to the exposed upper surface of said nonwoven layer;

(3) placing said copper bands in electrical contact with each other within said coating layer while it is still wet, and thereafter permitting same to dry or drying same;

(4) applying said adhesive layer in liquid or paste form to said coating layer after it has dried; and (5) applying said top layer to said adhesive layer while said adhesive layer is still tacky.

8. A method for constructing the electrically conductive flooring of claim 3 comprising: sequentially (1) applying said base layer to said existing flooring by contacting said side thereof having a layer of contact adhesive with said existing flooring;

(2) applying said coating layer in liquid form to the exposed upper surface of said nonwoven layer;

(3) placing said copper bands in electrical contact with each other within said coating layer while it is still wet, and thereafter permitting same to dry or drying same;

(4) applying said adhesive layer in liquid or paste form to said coating layer after it has dried; and (5) applying said top layer to said adhesive layer while said adhesive layer is still tacky.

9. The flooring of claim 2 wherein said electrically conductive coating layer is a polychloroprene, polybutadiene-styrene, or polybutadiene-acrylonitrile latex, or any mixture thereof, containing at least one electroconductive active substance.

10. The flooring of claim 9 wherein said electrically conductive adhesive layer consists essentially of latices of $C_{3-8}$ acrylate copolymers, vinylacetate-acrylate copolymers, polystyrene-butadiene, naturally occurring elastomers, or any mixture thereof as a binder, and carbon black as its electroconductive active substance.

11. The flooring of claim 2 wherein said electrically conductive adhesive layer consists essentially of an aqueous dispersion of at least one acrylate polymer or copolymer, predominantly vinylacetate copolymer, natural or synthetic elastomer, or any mixture thereof as a binder and at least one of carbon black, graphite, copper powder, silver powder, or any mixture thereof, as its electroconductive active substance.

12. A method for constructing the electrically conductive flooring of claim 2 comprising: sequentially (1) applying said base layer to said existing flooring by contacting said side thereof having a layer of contact adhesive with said existing flooring;

(2) applying said coating layer in liquid form to the exposed upper surface of said nonwoven layer;

(3) placing said copper bands in electrical contact with each other within said coating layer while it is still wet, and thereafter permitting same to dry or drying same;

(4) applying said adhesive layer in liquid or paste form to said coating layer after it has dried; and (5) applying said top layer to said adhesive layer while said adhesive layer is still tacky.

13. The method of claim 12 wherein said electrically conductive floor is grounded after said constructing is completed.

14. The method of claim 12 wherein said adhesive layer is made electrically conductive by the in situ addition of at least one electroconductive additive.

15. A method for constructing the electrically conductive flooring of claim 2 comprising: sequentially (1) applying said base layer to said existing flooring by contacting said side thereof having a layer of contact adhesive with said existing flooring;

(2) applying said coating layer in liquid form to the exposed upper surface of said nonwoven layer and permitting same to dry or drying same;

(3) applying said adhesive layer in liquid or paste form to said coating layer after it has dried;

(4) placing said copper bands in electrical contact with each other within said adhesive layer while it is still tacky; and (5) applying said top layer to said adhesive layer while said adhesive layer is still tacky.

16. The method of claim 15 wherein said electrically conductive floor is grounded after said constructing is completed.

17. The method of claim 15 wherein said adhesive layer is made electrically conductive by the in situ addition of at least one electroconductive additive.

18. The electrically conductive flooring of claim 2 in prefabricated form.

19. The flooring of claim 1 wherein said nonwoven base layer is an electrically non-conductive or substantially electrically non-conductive random-fiber nonwoven of polypropylene, polyethylene, polyterephthalate or polyamide fibers, or any mixture thereof, having a weight density of about 40–250 g/$m^2$; which base layer is provided with a layer of contact adhesive on that side which faces said existing flooring.

20. The flooring of claim 19 wherein said electrically conductive coating layer is polychloroprene whose electroconductive active substance consists essentially of carbon black and/or graphite.

21. The flooring of claim 20 wherein said electrically conductive adhesive layer consists essentially of latices of $C_{3-8}$ acrylate copolymers, vinylacetate-acrylate copolymers, polystyrene-butadiene, naturally occurring elastomers, or any mixture thereof as a binder, and carbon black as its electroconductive active substance.

22. The electrically conductive flooring of claim 19 in prefabricated form.

23. The flooring of claim 1 wherein said electrically conductive coating layer is a polychloroprene, polybutadiene-styrene, or polybutadiene-acrylonitrile latex, or any mixture thereof, containing at least one electroconductive active substance.

24. The flooring of claim 23 wherein said electrically conductive adhesive layer consists essentially of latices of $C_{3-8}$ acrylate copolymers, vinylacetate-acrylate copolymers, polystyrene-butadiene, naturally occurring elastomers, or any mixture thereof as a binder, and carbon black as its electroconductive active substance.

25. The flooring of claim 1 wherein said electrically conductive coating layer is polychloroprene whose electroconductive active substance consists essentially of carbon black and/or graphite.

26. The flooring of claim 1 wherein said electrically conductive adhesive layer consists essentially of an aqueous dispersion of at least one acrylate polymer or copolymer, predominantly vinylacetate copolymer, natural or synthetic elastomer, or any mixture thereof as a binder and at least one of carbon black, graphite, copper powder, silver powder, or any mixture thereof, as its electroconductive active substance.

27. The flooring of claim 1 wherein said electrically conductive adhesive layer consists essentially of latices of $C_{3-8}$ acrylate copolymers, vinylacetate-acrylate copolymers, polystyrene-butadiene, naturally occurring elastomers, or any mixture thereof as a binder, and carbon black as its electroconductive active substance.

28. A method for constructing the electrically conductive flooring of claim 1 comprising: sequentially (1) applying said base layer to said existing flooring by contacting said side thereof having a layer of contact adhesive with said existing flooring;

(2) applying said coating layer in liquid form to the exposed upper surface of said nonwoven layer and permitting same to dry or drying same;

(3) applying said adhesive layer in liquid or paste form to said coating layer after it has dried; and (4) applying said top layer to said adhesive layer while said adhesive layer is still tacky.

29. The method of claim 28 wherein said electrically conductive floor is grounded after said constructing is completed.

30. The method of claim 28 wherein said adhesive layer is made electrically conductive by the in situ addition of at least one electroconductive additive.

31. The electrically conductive flooring of claim 1 in prefabricated form.

* * * * *